(12) United States Patent
Dalan

(10) Patent No.: US 11,328,612 B2
(45) Date of Patent: May 10, 2022

(54) SYSTEM, METHOD, AND APPARATUS FOR DRONE POSITIONING CONTROL

(71) Applicant: Lane Dalan, Hermosa Beach, CA (US)

(72) Inventor: Lane Dalan, Hermosa Beach, CA (US)

( * ) Notice: Subject to any disclaimer, the term of this patent is extended or adjusted under 35 U.S.C. 154(b) by 247 days.

(21) Appl. No.: 16/540,603

(22) Filed: Aug. 14, 2019

(65) Prior Publication Data

US 2021/0049914 A1 Feb. 18, 2021

(51) Int. Cl.
*G08G 5/00* (2006.01)
*G05D 1/00* (2006.01)
*G05D 1/12* (2006.01)
*B64D 47/08* (2006.01)
*G06T 7/73* (2017.01)
(Continued)

(52) U.S. Cl.
CPC ............ *G08G 5/006* (2013.01); *B64C 39/024* (2013.01); *B64D 47/08* (2013.01); *G05D 1/0011* (2013.01); *G05D 1/0094* (2013.01); *G05D 1/12* (2013.01); *G06T 7/73* (2017.01); *G06V 20/13* (2022.01); *G08G 5/0069* (2013.01); *B64C 2201/027* (2013.01); *B64C 2201/127* (2013.01); *B64C 2201/141* (2013.01); *B64C 2201/146* (2013.01); *G06T 2207/10032* (2013.01); *G06T 2207/30204* (2013.01)

(58) Field of Classification Search
CPC .... G08G 5/006; G08G 5/0069; G08G 5/0052; G08G 5/0039; G08G 5/0078; G08G 5/045; G08G 5/0013; G08G 5/0021; G08G 5/0034; G08G 5/00; G05D 1/12; G05D 1/0094; G05D 1/0011; G05D 1/00; B64D 47/08; B64C 39/024; B64C 2201/027; B64C 2201/127; B64C 2201/141; B64C 2201/146; B64C 39/02; G06T 7/73; G06T 2207/30204; G06T 2207/10032; G06K 9/0063; G06K 9/00771

See application file for complete search history.

(56) References Cited

U.S. PATENT DOCUMENTS 3,564,134 A 2/1971 Rue et al.
5,581,250 A 12/1996 Khvilivitzky
(Continued)

FOREIGN PATENT DOCUMENTS

WO 2017017675 A1 2/2017

*Primary Examiner* — Yonel Beaulieu
(74) *Attorney, Agent, or Firm* — Omni Legal Group; Omid E. Khalifeh; Ariona K. Santoro

(57) ABSTRACT

A system, method, and apparatus for remotely controlled or even autonomous drone positioning control includes a drone, positioning control subsystem, subcontroller, positional or inertial sensor, processor, image sensor, and ground control device, and is configured to i) ascertain a geographical area having a geofence, ii) track at least one subject and an associated physical or digital marker within the geographical area, iii) recognize and process at least one marker geofence, iv) execute at least one positioning plan data set having at least one positioning path, and v) fly the drone per the data sets and paths without crossing a geofence or colliding with any obstacle. The present invention may also be configured to execute one or more commands that cause the drone to switch its position or path relative to priority or sequence-oriented commands, or to move the drone within a certain distance from the marker.

20 Claims, 7 Drawing Sheets

(51) Int. Cl.
*G06K 9/00* (2022.01)
*B64C 39/02* (2006.01)
*G06V 20/13* (2022.01)

(56) References Cited

U.S. PATENT DOCUMENTS

| | | | |
|---|---|---|---|
| 6,674,391 B2 * | 1/2004 | Ruszkowski, Jr. | H04N 19/593 |
| | | | 342/169 |
| 8,543,265 B2 | 9/2013 | Ekhaguere et al. | |
| 9,256,994 B2 | 2/2016 | Downey et al. | |
| 9,489,852 B1 | 11/2016 | Chambers et al. | |
| 9,508,263 B1 | 11/2016 | Teng et al. | |
| 9,595,198 B2 | 3/2017 | Limbaugh et al. | |
| 9,703,288 B1 | 7/2017 | Zhang et al. | |
| 9,714,089 B1 | 7/2017 | Louw et al. | |
| 9,738,399 B2 | 8/2017 | Lee et al. | |
| 9,769,387 B1 | 9/2017 | Beard et al. | |
| 9,776,716 B2 | 10/2017 | Levien et al. | |
| 9,778,662 B2 | 10/2017 | Tang | |
| 9,810,789 B2 | 11/2017 | Levien et al. | |
| 9,817,394 B1 | 11/2017 | Lema et al. | |
| 10,872,514 B1 * | 12/2020 | Glatfelter | G08B 21/02 |
| 11,074,827 B2 * | 7/2021 | Choi | G05D 1/0038 |
| 11,081,001 B1 * | 8/2021 | Pham | H04W 4/44 |
| 2007/0252748 A1 * | 11/2007 | Rees | H01Q 21/064 |
| | | | 342/29 |
| 2011/0049290 A1 | 3/2011 | Seydoux et al. | |
| 2011/0288696 A1 | 11/2011 | Lefebure | |
| 2014/0018976 A1 | 1/2014 | Goossen et al. | |
| 2014/0336848 A1 | 11/2014 | Saund et al. | |
| 2015/0370250 A1 | 12/2015 | Bachrach et al. | |
| 2016/0034712 A1 * | 2/2016 | Patton | G06F 16/29 |
| | | | 726/28 |
| 2016/0111006 A1 | 4/2016 | Srivastava et al. | |
| 2016/0117830 A1 | 4/2016 | Salahat et al. | |
| 2016/0156406 A1 * | 6/2016 | Frolov | H04W 16/28 |
| | | | 455/431 |
| 2016/0282861 A1 | 9/2016 | Golden et al. | |
| 2016/0299501 A1 | 10/2016 | Chang et al. | |
| 2016/0307447 A1 | 10/2016 | Johnson et al. | |
| 2017/0025024 A1 | 1/2017 | Kabrt et al. | |
| 2017/0102715 A1 | 4/2017 | Shi | |
| 2017/0123425 A1 | 5/2017 | Zhao | |
| 2017/0146344 A1 | 5/2017 | Clark | |
| 2018/0024555 A1 * | 1/2018 | Parks | B64C 39/024 |
| | | | 701/3 |
| 2021/0053680 A1 * | 2/2021 | Prest | G05D 1/0055 |

* cited by examiner

SYSTEM, METHOD, AND APPARATUS FOR DRONE POSITIONING CONTROL

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to unmanned vehicles, and more particularly, to a system, method, and apparatus for positioning remotely controlled or even autonomous vehicles, such as drones, based on the locations or movements of one or more subjects.

BACKGROUND

Remotely controlled, or even autonomous, ground, air, and water vehicles, herein referred to as "drones," serve many purposes. For example, drones mounted with cameras can be used to capture images and videos. Often, the subject of the image(s) is moving. Therefore, camera drones must not only be configured to move in precise formations, they also need to be configured to adjust to a subject's movements without contacting obstacles.

Certain artistic goals may also require the drone to maneuver in more complicated patterns than simply following a subject at a particular distance. For example, certain shots may require the drone to be closer or further away from the subject, or to vary the drone's speed in relation to the subject's speed. Or, certain aesthetic goals may require that the drone follow a sequence of movements, such as swinging from one side of the subject to the other, when the subject hits a particular mark.

In order to accomplish these and other goals, systems and methods are needed that provide for, among other functions, subject-tracking and multiple subject-tracking, obstacle recognition, geofence-based drone movement coordination, and real-time data computation of changes in velocity, vector, elevation, wind speed and so forth as applied to the above.

SUMMARY

The present disclosure is directed to a system, method, and apparatus for drone positioning control that controls a drone's movement along at least one path within at least one geographical area. The present invention may comprise, at least, a drone having at least one motor, and at least one first device, at least one sensor, and at least one processor. In some embodiments, the drone may also have a rotor, which provides necessary lift for some air vehicles, as well as a flight control subsystem. In still some other embodiments, the system may comprise a plurality of sensors, at least one of which is an image sensor.

Movement of the drone may be defined by a data set comprising one or more paths, one or more points in three-dimensional space referred to herein as "destinations," or in the case of air travel, one or more rotor instructions configured to be executed by the flight control subsystem, and more generally, data related to one or more geographic areas, subjects and/or markers, and geofences.

The present invention is configured to track a "subject," which herein means an identifiable object other than an element of the present invention, by means of one or more "markers." Physical markers of the present invention may comprise beacons that may be physically attached to a subject. Digital markers of the present invention may comprise digital tags applied by one or more sensors or processors to a subject identified within one or more images. Marker geofences may be digitally applied to markers by the present invention. The present invention is configured to track a subject by tracking one or more markers attached to the subject, whether it be a physical marker, a digital marker, or one or more of each. In some embodiments, the present invention may identify at least one salient feature within an image and use the salient feature(s) as a basis for a digital marker. Salient feature geofences may demark no-go drone travel areas drawn in relationship to the salient feature. Unless otherwise specified, "subject" and "marker" (and "subject geofence" or "marker geofence") may therefore be used interchangeably herein.

In embodiments that provide for a plurality of subjects and/or markers, the system may recognize a hierarchy of priorities wherein a subject or marker may be assigned a higher or lower priority along with paths of higher or lower priority. In such embodiments, the present invention may provide that the drone of the present invention may switch from one path to a different path according to intervening factors, such the presence of an obstacle along one path but not the other.

A geographical area, as contemplated with respect to the present invention, may be a digitally-recognized portion of any real-world environment. In some embodiments, more than one geographical area may be ascertained by the present invention. In some embodiments, the portion defined as a geographical area may change. Non-limiting examples include a penalty box within a soccer field, two penalty boxes within a soccer field, a soccer field within a stadium, a stadium within a city block, and so forth. Other non-limiting examples may include a jogging path within a park or a track within an arena. Any size geographical area is contemplated by the present invention.

In some embodiments, a geofence may be a virtual perimeter, or volume of space, or boundary within a location that limits the allowable drone positions to within the geographic area or volume. In some embodiments, a geofence envelope or "geoenvelope" may represent a block of three-dimensional no-go space surrounding an object or natural barrier. One or more marker geofences may be associated with the one or more markers, similarly demarking a no-fly area. In some embodiments, geofences may serve as "keep-ins" or "keep-outs." Digital objects rendered in a modeling program can operate as landmarks or boundaries as well.

A path may be a course along a surface or through three-dimensional space, depending on the particular capabilities of the drone, within a geographical area that contains at least one destination, or more particularly a series of destinations. The path may be a predetermined set of corresponding subject and drone positions or may be dynamic. In dynamic embodiments, the present invention may provide that the flight path may be configured to be adjusted by the flight control subsystem to account for changes to or movements of obstacles, subjects, or both, as well as changes in weather or other flight conditions. The present invention may provide that the adjustments may range from the smallest deviation possible to avoid a collision to a substantially different flight path as compared to the original flight path. In some embodiments, the present invention may be configured such that if the present invention calculates that the adjustment from the flight path required to avoid a collision is under a certain value that the drone of the present invention may deviate by just the amount required to avoid the collision, but if the adjustment is over a certain value then the present invention may provide that the flight control subsystem may adjust from one flight path to another flight path.

A "digital" marker of the present invention is a marker that is created, manipulated, applied, tracked, removed, analyzed, and so forth by or necessarily in conjunction with a computer. With respect to the present invention, in some embodiments, an image sensor, an optical flow sensor, a motion capture sensor, a camera, a positioning control subsystem, a processor, or other such element may either capture or receive a digital image or other data relevant to ascertaining an object's position and movement through three-dimensional space. Within that data, the present invention may identify, or may receive and process, one or more salient features within the digital image, such as but not limited to, salient features of a subject. These salient features may in turn provide one or more distinctions to which an element of the present invention such as but not limited to the positioning control subsystem may apply, or receive and apply, a digital marking. Additional digital images may be obtained, such as photographs or video, that contain one or more salient features. The present invention may overlay or otherwise associate the marked salient feature(s), or the digital marking(s), to the additional visual data and compare and reapply, or otherwise track, the salient feature and/or the digital marker through each incoming photograph and/or video, thus digitally tracking a real-life subject. Any other method of optical tracking, object recognition, or even mechanical capture technique is also contemplated by the present invention. The foregoing is but one example.

By contrast, again by way of illustration and not limitation, a physical marker (or "beacon") herein means, at least, a physical transponder or other tangible element affixed or integral to a physical object or person. The beacon may, at least, react to or correspond with one or more towers or sensors and either passively or actively transmit or provide data as to, at least, the position of the beacon in three-dimensional space and, if the beacon is moving, as to its vector, velocity, trajectory, or other applicable information. Again, any capture or recognition technique is contemplated, but mechanical or other non-optical motion tracking techniques may be appropriate to track a physical beacon's movement through three-dimensional space in addition to or in substitution of optical or vision-based capture techniques.

In some embodiments, the subjects or markers may be tracked by certain global positioning systems (GPS) or differential GPS, with, in some embodiments, additional Digital Terrain Elevation Data (DTED). Tracking also may be accomplished via static sensing towers that may differentiate between multiple subjects by a host of variables, including but not limited to a subject or marker's size, color, or surface ornamentation (such as symbols, letters, or numbers). For more than one drone and more than one subject, in some embodiments, each subject's position may correspond to a different drone position.

The drones' positions may, in some embodiments, be "absolute," meaning the position is based on stationary or preexisting coordinates. For example, GPS in combination with an altimeter may provide a fixed position in three-dimensional space. In some embodiments, an "absolute" position is a position that does not take a marker's position into account. The present invention may model the drone's flight path and the absolute destination(s) ahead of time in a computer program, while the drone is in flight, or a combination of prior and real-time flight path computations. In still other embodiments, however, the "absolute" position may take into account the preexisting coordinates of one or a series of stationary subjects into account.

In the same or other embodiments, the drone's positions may be "relative," meaning the position may be dependent on a spatial relationship between a drone and a subject or marker. By way of non-limiting examples, a relative drone position may be a position of the drone a fixed distance and fixed angle from a marker, a fixed distance and regularly changing angle from a marker, a regularly changing distance and a fixed distance from a marker, or a regularly changing distance and regularly changing angle from a marker. In embodiments wherein the present invention provides for real-time adjustment of positioning based on one or more moving markers, the present invention may calculate any or all of such markers location, orientation vectors, velocity vectors, acceleration vectors, and other observables to the effect of maintaining the drone's position relative to the marker(s), for example the drone's distance from and angled position relative to the marker(s). One or more of the above-disclosed embodiments, in addition to certain alternatives, are provided in further detail below with reference to the attached figures. The disclosed subject matter is not, however, limited to any particular embodiment disclosed.

DETAILED DESCRIPTION

Figure 1:
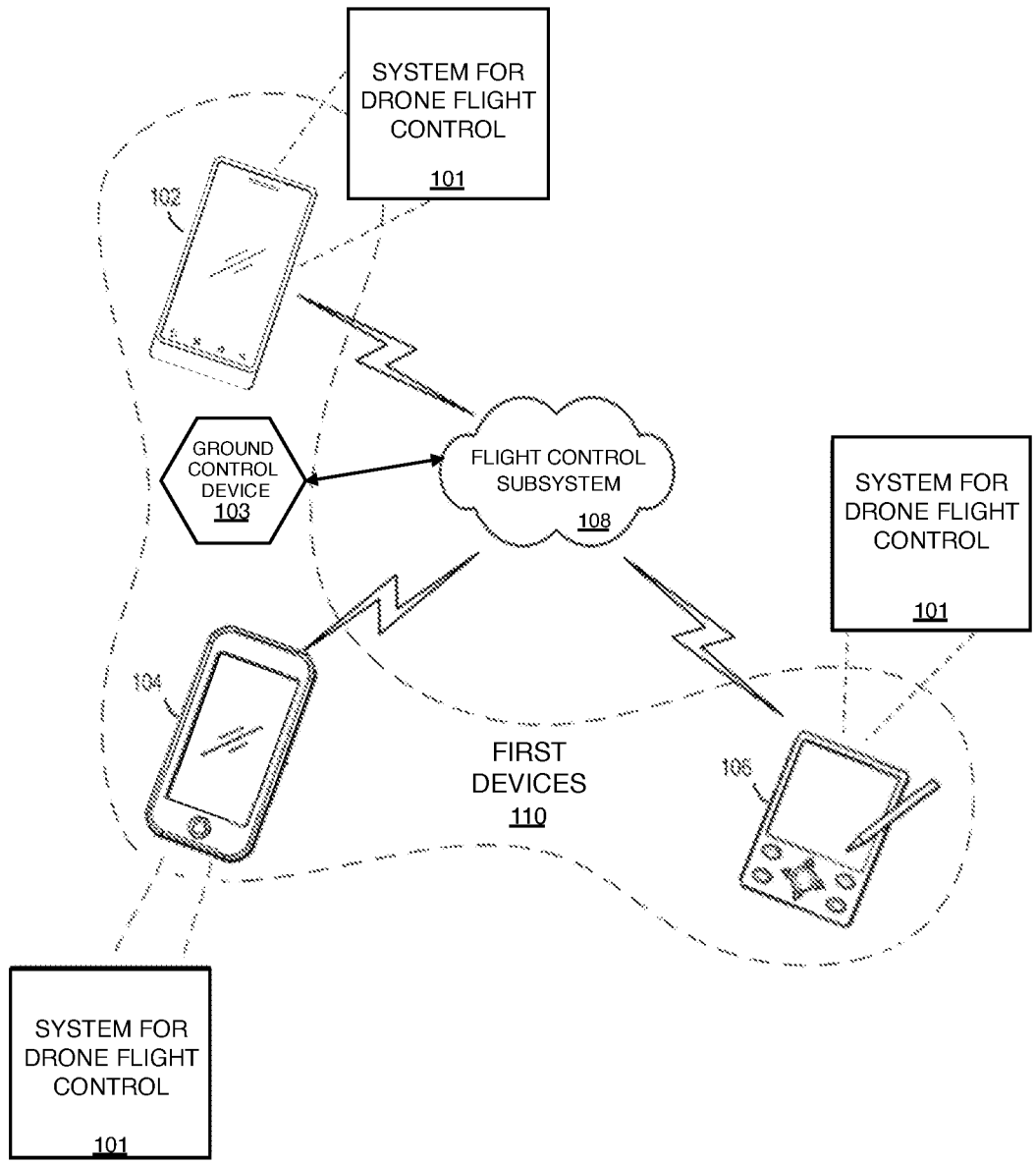
FIG. 1 is a block diagram of a networked environment in which an exemplary embodiment of a system for drone positioning control is implemented.

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

As used herein, the term "digital" refers to any action, version, construct, representation, or other element that exists primarily or solely in a computer program or electronic medium.

Although it should be clear to one of ordinary skill in the art that the system, method and apparatus for drone positioning control contemplates and is applicable to an unlimited variety of drones, flying drones will be discussed below in more detail for the sake of providing certain examples of the invention. Therefore, flight control and flight plan data sets may encompass or alternatively refer to ground and underwater positioning control as well as more general positioning data sets.

A system for drone positioning control comprises a drone having at least a motor and, in some embodiments, at least one rotor. Additionally, the system for drone positioning control may comprise a flight control subsystem onboard the drone configured to provide flight control for the drone by executing at least one flight plan data set, at least one processor, and at least one first device, which in some embodiments may comprise a ground control device. In some embodiments, the system may further comprise at least one image sensor onboard the drone and communicatively coupled to the flight control subsystem. The flight control subsystem may comprise one or more subcontrollers. In some embodiments, the system may also comprise a communications unit, a distance detecting sensor, at least one camera, and a payload delivery component or system.

A method for drone flight control comprises a method of positioning a drone, by a user or the present invention or both, of at least one drone having at least one flight control subsystem configured to execute a flight plan data set via one or more subcontrollers, image sensor, motor, and rotor, and in some embodiments, at least one communications unit, distance detecting sensor, camera, and payload delivery component or system. The method may comprise executing commands pre-loaded onto the flight plan subsystem, manipulation by a user of a ground control device configured to command the flight plan subsystem, or both.

An apparatus for drone flight control also comprised one or more of at least one ground control device, a drone having at least flight control subsystem onboard that is configured to provide flight control for the drone by executing at least one flight plan data set, at least one image sensor onboard the drone and communicatively coupled to the flight control subsystem, at least one processor, and at least one motor and rotor communicatively coupled to the motor. In some embodiments, the apparatus may also comprise at least one communications unit, distance detecting sensor, camera, and payload delivery component or system.

One or more of the above-disclosed embodiments, in addition to certain alternatives, are provided in further detail below with reference to the attached figures. The disclosed subject matter is not, however, limited to any particular embodiment disclosed.

FIG. 1 illustrates an exemplary embodiment of the present invention which includes a plurality of electronic devices communicatively coupled to one another. By way of example, and not limitation, FIG. 1 illustrates mobile devices 102, 104, 106 and ground control device 103 that incorporate a system for drone flight control 101 and are communicatively coupled to flight control subsystem 108. Each of the mobile devices may be embodied as a mobile computing device such as, for example and without limitation, a smartphone or tablet computer that incorporates cellular telephone functionality. Notably, the communications network can use one or more of various communications types such as, for example and without limitation, cellular and Wi-Fi communications. In embodiments having a blockchain database backend or other comparable elements, one or more nodes (not pictured) may take the place of one or more of mobile devices 102, 104, and 106, and ground control device 103.

In some embodiments, the present invention may provide that one or more of ground control device 103 and mobile devices 102, 104, and 106 may serve as a first device 110. In such a configuration, one or more of ground control device 103 and/or mobile devices 102, 104, and 106 may be configured to display any or all of flight controls or otherwise operate or allow a user to operate the present invention.

Ground control device 103 may, in some embodiments, be a desktop computer, a handheld controller, a remote controller, a remote control, a wearable, a virtual reality system, a virtual reality headset, a virtual reality motion capture device, a simulator, a flight control simulator, a joystick, or any other device or system known in the art to interface with unmanned aerial vehicles, or configured to move a drone, known in the art.

In embodiments wherein a flight path determination involves any human modeling input, a 3D mouse or other input device may be used to create an anticipated subject path, a drone path, or a drone position relative to a subject or marker. One or more physical element detection systems may be provided herein as a first device 110 or ground control device 103. Among them may be one or more LIDAR modules, which may be carried onboard a drone, placed on a physical element within a geographical area, communicatively coupled to a ground control element, placed on a physical element outside of a specified geographical area, communicatively coupled to a satellite, communicatively coupled to a drone uncoupled to the present invention, or any combination of the foregoing.

Users of ground control device 103 and mobile devices 102, 104, and 106 may be users of at least one network known to those skilled in the art. For instance, as noted above, network may comprise a peer-to-peer network, a cloud-based computing network, a fog computing network, a blockcloud computing network, or any other network known in the art capable of secure data transfer. In some embodiments, network may be facilitated by a website that may require a registration and login prior to use.

Figure 2:
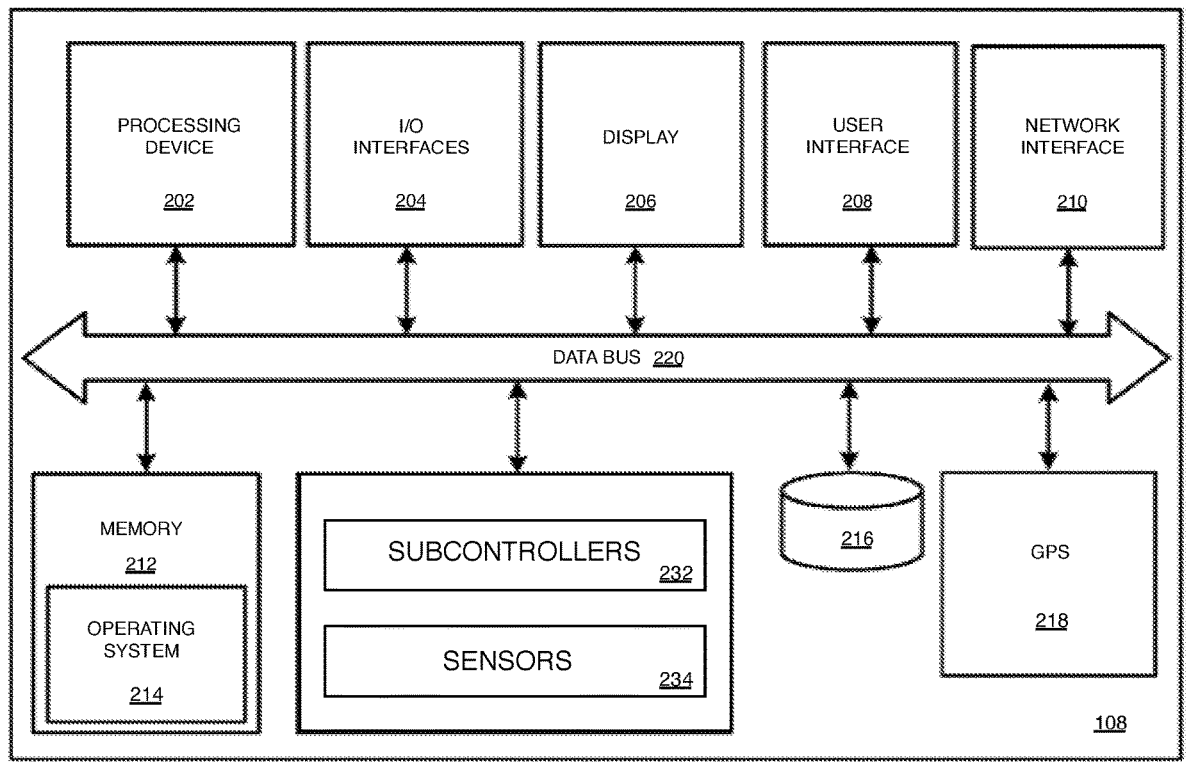
FIG. 2 is an illustration depicting elements of a positioning control subsystem.

FIG. 2 illustrates at least one configuration of flight control subsystem 108. In some embodiments, mobile devices 102, 104, and 106, and ground control device 103 may comprise at least one comparable device, either alternatively, simultaneously, or in addition to their roles as either a first electronic device or a second electronic device.

In the embodiment depicted in FIG. 2, flight control subsystem 108 may comprise, at least, at least one processing device (processor) 202, at least one input/output interface 204, at least one display 206, at least one user interface 208, at least one network interface 210, at least one memory 212, at least one operating system 214, at least one mass storage 216 and at least one GPS 218, with each communicating across a local data bus 220.

The processing device 202 may include any custom made or commercially available processor, a central processing unit (CPU) or an auxiliary processor among several processors associated with flight control subsystem 108, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 212 can include any one of a combination of volatile memory elements (e.g., random-access memory (RAM, such as DRAM, and SRAM, etc.)) and nonvolatile memory elements. The memory typically comprises native operating system 214, one or more native applications, emulation systems, or emulated applications for any of a variety of operating systems and/or emulated hardware platforms, emulated operating systems, etc. For example, the applications may include application specific software which may comprise some or all the components of flight control subsystem 108. In accordance with such embodiments, the components are stored in memory and executed by the processing device. Note that although depicted separately in FIG. 2, the system, method, and apparatus for drone flight control may be resident in memory such as memory 212. As mentioned above, in embodiments having a blockchain database element, one or more nodes may not have their own memory 212 and/or operating system 214 or may store incomplete memory 212 and/or operating system 214, and may therefore draw upon other nodes for use of one or more memory units 212 and/or operating system elements 214. Similarly, in cloud-based embodiments, memory 212 and/or operating system 214 may be stored on a central server and accessed via first device 110.

User interface 208 may be configured to detect contact within the display area of the display 206 and may provide such functionality as on-screen buttons, menus, keyboards, etc. that allows users to navigate user interfaces by touch. Certain input/output interfaces 204 may also be a keyboard, a mouse, a 3D mouse, a joystick, a steering wheel, a microphone, a vision tracking system, a motion-capture system, a trackball, a virtual reality headset, a gyroscope, an accelerometer, a particle-detection sensor ("particle sniffer"), a LIDAR mapping unit or hub, a camera, a video camera, a beacon, or any other known interface with a computing system. For some embodiments, flight control subsystem 108 may also comprise GPS 218 or other means to determine the location of the flight control subsystem 108.

Figure 3:
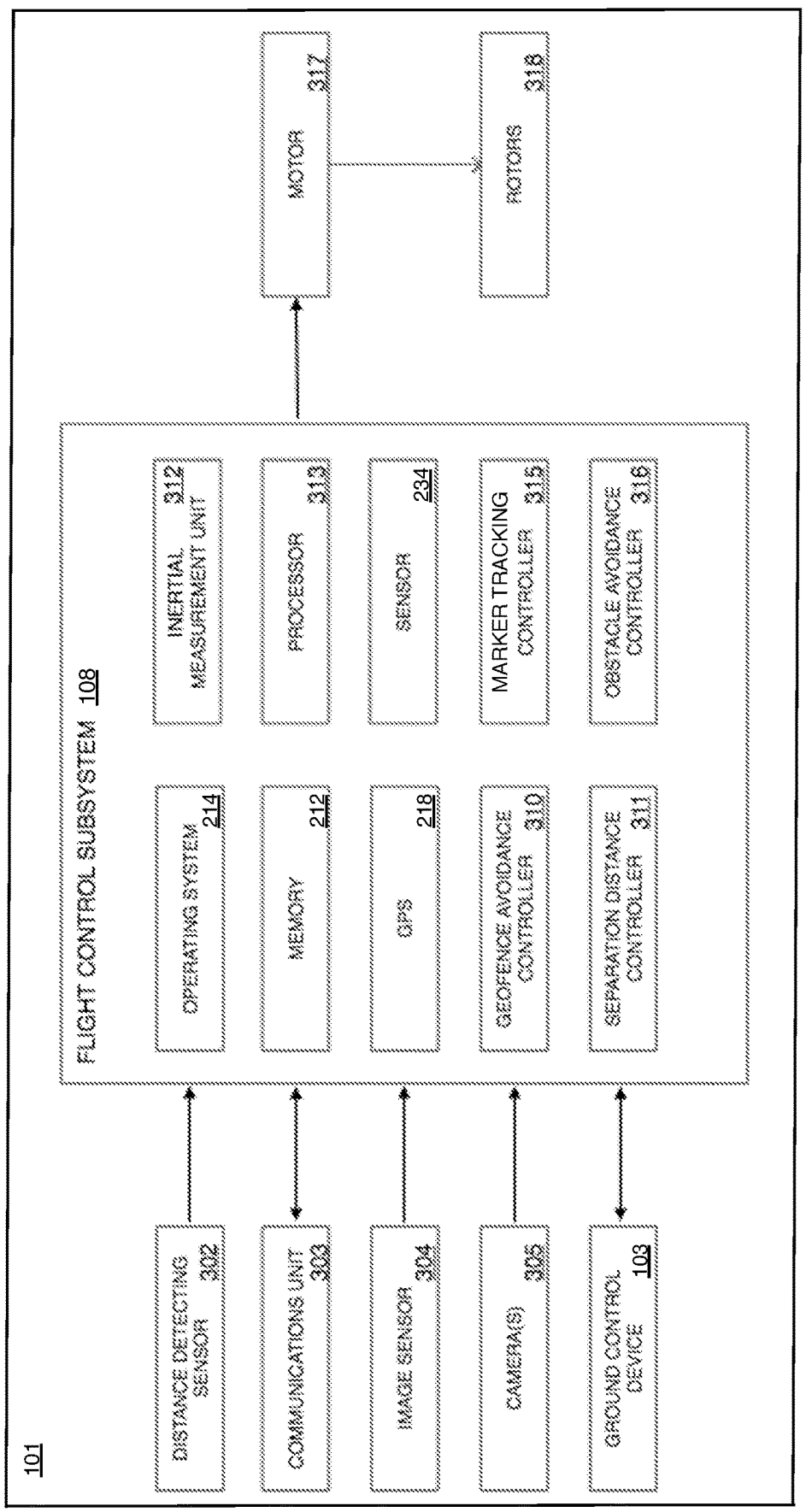
FIG. 3 illustrates an additional non-limiting example configuration of a positioning control subsystem.

Remaining with FIG. 2, flight control subsystem 108 may further comprise subcontrollers 232 and sensors 234. The flight control subsystem 108 may comprise many more elements, as shown in FIG. 3 and elsewhere herein. Additionally, subcontrollers 232 and sensors 234 may be in communication with other elements within or communicatively coupled to flight control subsystem 108, and may also be communicatively coupled to elements outside or uncoupled to flight control subsystem 108, such as by way of non-limiting example, to a communications tower.

Each subcontroller 232 may provide for one or more processors onboard or communicatively coupled to the subcontroller 232. Each subcontroller 232 processor may be configured to execute the operation of the subcontroller 232 to which it is communicatively coupled. As used herein, "processor" unless otherwise identified may refer to either a processor dedicated to flight control subsystem 108 or to a subcontroller 232, or to both if applicable, such as when more than one function is contemplated, or when at least one function would be better carried out across more than one processor.

The at least one sensor 234 may comprise one or more of at least one image sensor 304, subject detecting sensor, subject distance detecting sensor, subject velocity detection sensor, subject vector detecting sensor, subject spatial coordinate sensor, subject acceleration sensor, obstacle detection sensor, obstacle distance detecting sensor, obstacle velocity detection sensor, obstacle vector detecting sensor, obstacle spatial coordinate sensor, obstacle acceleration sensor, collision avoidance sensor, altimeter, gyroscope, ultrasonic wind sensor or other anemometer, accelerometer, hygrometer, thermometer, particulate matter sensor, inertial sensor, thermal sensor, thermal camera, barometer, sonar sensor, video camera, optical flow sensor, mechanical motion sensor, rangefinder, LIDAR (or "LiDAR" or "lidar" at times herein) sensor or hub, pitot-static system, time-of-flight sensor, vision sensor, infrared sensor, ultrasonic sensor, monocular vision sensor, microphone, magnetometer, electromagnetic sensor, compass, roll sensor, pitch sensor, yaw sensor, sensor configured to measure movements within six degrees of freedom, sensor configured to detect different weather conditions or patterns, ground sampling distance sensor, and any other sensor 234 associated with drones in the art. The present invention may utilize a combination of sensors 234. For example, as a collision avoidance sensor, the present invention may utilize one or more monocular vision sensors, ultrasonic/sonar sensors, infrared sensors, LIDAR sensors, time of flight sensors, vision sensors, or other sensors 234, but the present invention is not limited to such use for such sensors 234.

One of ordinary skill in the art will appreciate that the operating system 214 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 2, network interface device 210 comprises various components used to transmit and/or receive data over a networked environment such as depicted in FIG. 1. When such components are embodied as an application, the one or more components may be stored on a non-transitory computer-readable medium and executed by the processing device.

Remaining with FIG. 2, the present invention may be, and is contemplated generally to be, configured such that one or more flight control subsystems 108 may communicate with each other. This communication may provide for and enables one or more functions of the present invention, such as by way of illustration and not limitation, geopositioning, object avoidance, timing sequences, real-time data transfer, and so forth. Additionally, one or more nodes may utilize a device to device communication system to share one or more elements, such as but not limited to, part or all of at least one processor 202, at least one input/output interface 204, at least one display 206, at least one user interface 208, at least one network interface 210, at least one memory 212, at least one operating system 214, at least one mass storage 216, at least one GPS 218, and/or at least one local data bus 220.

In order to facilitate the aforementioned functionality, various aspects may be performed by one or more of ground control device 103 and/or mobile devices 102, 104, and 106, or any device which may be but is not limited to ground control device 103 and/or mobile devices 102, 104, and 106. In one embodiment, the ground control device 103, mobile devices 102, 104, and 106, and/or any comparable device are operative to perform, at least in part, a method for drone flight positioning disclosed herein.

Turning attention to FIG. 3, an exemplary system for drone flight control 101 is disclosed. In the embodiment depicted, distance detecting sensor 302, communications unit 303, image sensor 304, camera(s) 305, ground control device 103, motor 317 and rotor(s) 318 may be perceived. In some embodiments, these elements may be communicatively coupled with flight control subsystem 108. FIG. 3 also discloses several elements of flight control subsystem 108, including operating system 214, memory 212, GPS 218, inertial measurement unit (IMU) 312, processor 313, at least one sensor 234, geofence avoidance controller 310, marker tracking controller 315, separation distance controller 311, and obstacle avoidance controller 316. The flight control subsystem 118 of the present invention may, in some embodiments comprise more elements than shown in FIG. 3.

Remaining with FIG. 3, flight control subsystem 108 may be configured to receive, create, modify, and/or execute one or more aspects of a flight plan data set. Of course, one skilled in the art will recognize that depending on whether the drone is an unmanned ground, air or underwater vehicle the flight control subsystem 108 may be another appropriate positioning control subsystem. More specifically, in some embodiments, one or more of flight control subsystem 108 elements operating system 214, memory 212, GPS 218, inertial measurement unit 312, processor 313, at least one sensor 234, geofence avoidance controller 310, marker tracking controller 315, separation distance controller 311, and obstacle avoidance controller 316 may communicate with each other to receive, create, modify, and/or execute one or more aspects of a flight plan data set. In some embodiments, flight control subsystem 108 may also comprise an electronic speed controller (not shown). One or more subcontrollers 232 may comprise one or more calculators for object distance, velocity, altitude, acceleration, vector, spatial coordinates, angles and relative angles (not shown).

In order to execute the flight plan data set, flight control subsystem 108 may send one or more rotor instructions to motor 317, which may operate rotor(s) 318 in such a way as to fly the drone and its cargo, including but not limited to flight control subsystem 108, distance detecting sensor 302, communications unit 303, image sensor 304, camera(s) 305, a payload, or any other onboard element, to one or more destinations, as that term is used herein. In some embodiments, the at least one rotor instruction may be a near-constant or constant set of rotor instruction, updating in real-time. Accordingly, the term "rotor instruction" herein is used to mean one or more rotor instructions.

The various subcontrollers 232 of the flight control subsystem 108 may utilize information from another element of the present invention to communicate with the processor 313 or other element of flight control subsystem 108 to generate the one or more rotor instructions. By way of illustration, obstacle avoidance controller 316 may utilize information from image sensor 304, distance detecting sensor 302, inertial measurement unit 312, and/or memory 308 to generate a rotor instruction that may be processed by the processor 313 and provided to the motor 317, which may in turn cause the rotor(s) 318 to change their behavior, resulting in an adjustment in flight direction that enables the drone to avoid an obstacle.

Likewise, the separation distance controller 311 may similarly draw upon image sensor 304, distance detecting sensor 302, inertial measurement unit 312, and/or memory 308 to generate a rotor instruction that may be processed by the processor 313 and provided to the motor 317, which may in turn cause the rotor(s) 318 to maintain a distance between the drone and a marker or subject.

As well, geofence avoidance controller 310 may use image sensor 304, distance detecting sensor 302, inertial measurement unit 312, and/or memory 308 to generate a rotor instruction that may be processed by the processor 313 and provided to the motor 317, which may in turn cause the rotor(s) 318 to prevent the drone from crossing a geofence.

Similarly, marker tracking controller 315 may utilize the image sensor 304, distance detecting sensor 302, inertial measurement unit 312, and/or memory 308 to generate a rotor instruction that may be processed by the processor 313 and provided to the motor 317, which may in turn cause the rotor(s) 318 to fly the drone in such a manner or along a path configured to track a subject or marker across various weather, terrain and visibility conditions.

Additionally, in some embodiments, each subcontroller 232 may have its own operating system, processor, memory, and so forth so as to enable it to serve as a stand-alone subsystem or computer.

In some embodiments, distance detecting sensor 302 may comprise any sensor or device capable of ascertaining and calculating the distance between the sensor and another object. When not physically attached to one or more drones of the present invention, distance detecting sensor 302 may be configured to receive location information for the one or more drones, ascertain one or more objects' locations, and calculate the distance between the one or more drones and the one or more objects. In some embodiments, distance detecting sensor 302 may be configured to ascertain and calculate the distance between distance detecting sensor 302 and one or more stationary objects, between one or more stationary objects and one or more drones, between two or more stationary objects, or any combination. In some embodiments, distance detecting sensor 302 may be configured to ascertain and calculate the distance between distance detecting sensor 302 and one or more moving objects, between one or more moving objects and one or more stationary objects, between one or more moving objects and one or more drones, between two or more stationary objects, or any combination thereof. Distance detecting sensor 302 may detect distances using ultrasonic means, by video capture, by tower triangulation, or any means or method known in the art.

It is contemplated that communications unit 303 may, in some embodiments, be a wireless module for radio or other wireless communication with an external device, such as a ground control device 103 or other first device 110. Non-limiting examples of communications unit 303 may include a Bluetooth module, a wireless local area network (LAN) module, or even a first device 110 configured for use as a communications unit 303.

Image sensor 304, or as may be referred to herein or may comprise a vision sensor or other visual element analyzation sensor, together with one or more processors 313, may be configured to capture a plurality of images, identify one or more environments from within the images, identify one or more salient features from within the environment(s), calculate a distance from image sensor 304 to each salient feature, and in some embodiments, determine a drone position based on the distance from image sensor 304 to each salient feature. The salient feature(s) may be stationary or moving. In a plurality of salient features, in some embodiments, one or more salient features may be stationary while one or more salient features may be in motion. The drone position(s) may be a stationary position or a moving position relative to the stationary salient feature(s). In some embodiments, one or more of the plurality of stationary salient features may comprise visual features of a subject. In some embodiments, one or more of the plurality of stationary salient features may comprise visual features of an obstacle.

As used herein, salient features may refer to salient regions or distinct (e.g., recognizable) elements or visual objects within an image. In some embodiments, the salient feature of interest may be an element within an image that is likely to catch the attention of or stand out to a human observer. Generally, a salient feature may be selected or identified using one or more sensors 234, such as but not limited to image sensor 304, a visual sensor, or a collision avoidance sensor. A salient feature may be selected from a single image, or from a succession of images (i.e. video). Salient images may be identified on moving objects, inanimate objects, humans, animals, faces, bodies, structures, buildings, vehicles, planes, signs, landmarks, marks, logos, obstacles, and so forth within an image or video. A "persistent" salient feature may be found in two or more images taken of at least some common subject matter from different vantage points, under different weather conditions, or at different times of day.

Image sensor 304, or another element of the present invention, for example processor 303 or a subcontroller 232 such as geofence avoidance controller 310, marker tracking controller 315, separation distance controller 311, or obstacle avoidance controller 316, may identify or determine one or more salient features using any existing detection method, such as by way of non-limiting example contrast-based filtering wherein the contrast between colors, depths of field, size, speeds of motion, and so forth provides the contrast used to identify the object or salient feature. Additional detection methods may include a spectral residual approach, methods utilizing a binarized-normed gradient, a context-aware top down approach, methods that measure visual saliency by site entropy rate, other image-processing programs, and so forth. Salient features may also be detected using devices employing machine learning and/or object recognition algorithms, via computer vision using a saliency map, or by applying pre-stored salient feature profiles overlaid on images. Salient features may be recognized by image sensor 304, processor 303, a subcontroller 232, or another element of the present invention on a real-time basis.

The at least one salient feature geofence may be digitally drawn or applied in a relationship to the at least one salient feature by image sensor 304, processor 303, a subcontroller 232, a processor associated with a subcontroller 232, or another element of the present invention. The present invention may be configured to do so in real-time. In some embodiments, the relationship may be a static distance between the at least one salient feature and the at least one salient feature geofence. In some embodiments, the relationship may be a dynamic distance between the at least one salient feature and the at least one salient feature geofence that may change based on the movement or nature of at least one subject, at least one obstacle, or at least one object. The at least one salient feature geofence may be used by a subcontroller 232 of the present invention as a geofence within the purview of the subcontroller 232, such as by way of illustration if the geofence avoidance controller 310 applied a salient feature geofence generated by another element of the present invention as its operative geofence.

With continued respect to FIG. 3, motor 317 and rotor(s) 318 may be configured to fly one or more drones. The drone of the present invention may comprise such non-limiting examples as single rotor copters, multi-rotor copters such as a quad-copter, propeller-driven aircraft, jet engine aircraft, gliders, parachute-configured vehicles, non-rigid airships, another form of airship, or even a maglev transportation device such as a hovertrain or hover rail, or any other flight or airborne device. Additionally, as previously noted, the drone of the present invention may be an unmanned ground vehicle such as a single or multi-wheeled terrestrial vehicle. Indeed, one or more drones of the present invention may be configured to move along a track, such as by way of non-limiting example, along a cable or rail.

Rotor(s) 318 of the present invention may comprise rotors commonly found in the above-described drones, such as but not limited to standard (tractor) propellers and pusher propellers. The present invention's motor(s) 317, rotor(s) 318, and/or flight control subsystem 108 may be configured to enable the present invention to fly in any direction, such as but not limited to straight-line and spiral flight patterns. The present invention may have one or more onboard computers sufficient to cause the drone to maneuver in response to one or more commands.

Motor 317 may be configured to execute one or more rotor instructions under the direction of flight control subsystem 108. Thus, the one or more rotor instructions may, when implemented by flight control subsystem 108, cause rotor(s) 318 to move in such a way as to cause the present invention to locomote (i.e. fly or otherwise travel) to a particular destination. Motor 317 may be configured to be powered by fossil fuels such as gasoline, electrical power such as stored in a battery or conducted from a utility grid, electrical energy derived from renewable energy sources such as solar cells or wind power, or any other known power source or conduit. Relatedly, the onboard electrical equipment may be configured to be powered by any form electricity, whether grid, solar, battery, or produced from a stand-alone generator powered by fossil fuels.

In some embodiments, the present invention may comprise camera(s) 305, such as but not limited to traditional still photography cameras, video cameras, specialty cameras (such as IMAX® cameras), specialty camera units or setups, microphones configured for use with filming such as a wind-shielded or directional microphone, and any other element associated with drone-assisted filming. Camera(s) 305 may also be configured to automatically initiate different picture settings, such as camera angle, pan, zoom, aperture, ISO, shutter speed, and so forth in response to a subject or marker's position, velocity, acceleration, and other stationary or dynamic characteristics. Of course, other payloads are contemplated. Cameras are described as just one exemplary type of payload, however, one skilled in the art will recognize that the drone is not limited to use with cameras as payloads and may be suitable for use with other types depending, for example, on the subject and environment. The present invention may also comprise at least one gimbal, gimbal motor, and gimbal controller unit, any ball joint camera mount and related equipment, or any camera-holding or operating equipment. Camera(s) 305 may be configured to operate in conjunction with the gimbal equipment, and vice versa.

In some embodiments, the present invention may be configured to carry a load or a payload (not shown in FIG. 3). A payload may comprise a camera 305, camera equipment, sensors 234, additional drones, or even persons. The present invention may further comprise a bed, net, trunk or other compartment configured to retain a payload (collectively, "compartment"). The compartment may be fixedly connected to the drone's body or detachable from the drone's main body. In some embodiments, in addition to or in substitution for a compartment, the present invention may further comprise a carrier configured as a rope or chain attached to a clip such as a carabiner, with a payload connected to the clip.

An inertial measurement unit 312 may be any inertial measurement unit or comparable module known in the art. In some embodiments, the inertial measurement unit 312 may be absent, and flight controller 108 or one or more subcontrollers 232 may utilize one or more sensors 234 to achieve the same result. For example, instead of an inertial measurement unit 312, the present invention may utilize one or more separate sensors 234 such as an accelerometer, gyroscope, altimeter, magnetometer, anemometer, or other sensor 234. The information from these sensors 234 may be processed by processor 313, a subcontroller 232, ground control device 103, operating system 214, inertial measurement unit 312, or any other element of the present invention.

Figure 4:
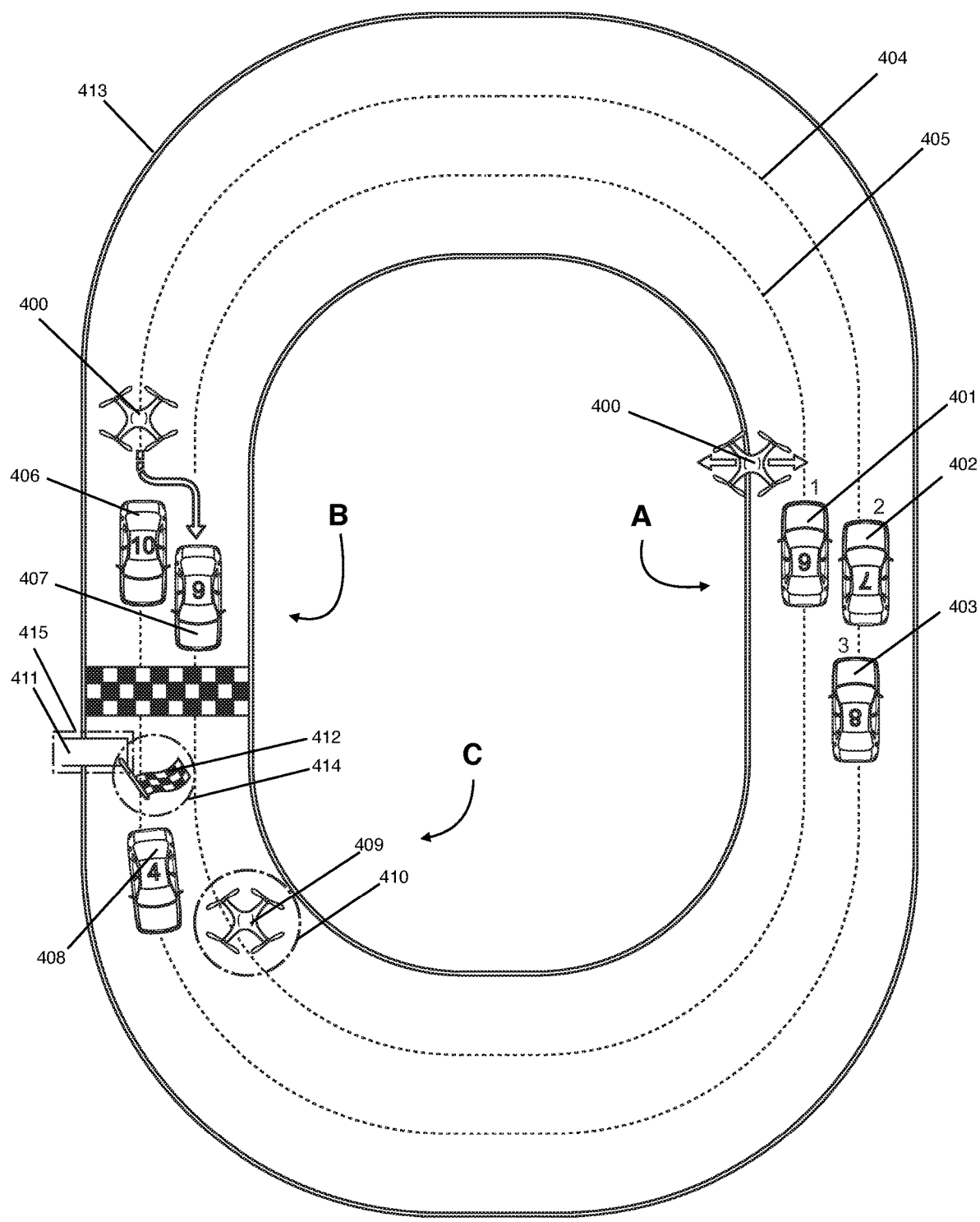
FIG. 4 is an illustration of a system for drone positioning control as used in conjunction with a car race.

Turning attention to FIG. 4, a viewer may perceive an exemplary embodiment of a system for drone flight control as used on a racecar track. In the embodiment depicted, a user may perceive drone 400, first car 401, second car 402, third car 403, drone flight path one 404, drone flight path two 405, fourth car 406, fifth car 407, sixth car 408, second drone 409, second drone geofence 410, platform obstacle 411, flag obstacle 412, racetrack 413, flag geofence 414, and platform geofence 415. It should be noted however, that while drone flight paths one and two 404, 405 appear to correspond with lanes on the racecar track, it is contemplated that the position of the drones 400 may depend alternatively on the particular path of a certain car, which car of course may vary. As a non-limiting example, this may allow a drone to follow a subject car between apparent lanes, off of or away from set drone paths, such as into a pit stop or other off-track area.

In the embodiment disclosed in FIG. 4, racetrack 413 serves as the selected geographic area for purposes of illustration. Drone 400 is depicted as hovering above racetrack 413 and may be presumed to have at least one or more of flight control subsystem 108, distance detecting sensor 302, communications unit 303, image sensor 304, camera(s) 305, motor 317 and rotor(s) 318, operating system 214, memory 212, GPS 218, inertial measurement unit (IMU) 312, processor 313, at least one sensor 234, geofence avoidance controller 310, marker tracking controller 315, separation distance controller 311, and obstacle avoidance controller 316 onboard (not separately labeled), though one or more of the above elements may be omitted in one or more alternative embodiments.

Remaining with FIG. 4, drone flight path one 404 and drone flight path two 405 are represented as lines of travel in the air above certain portions of racetrack 413, and are represented as oval paths within larger oval-shaped racetrack 413. First car 401, second car 402, third car 403, fourth car 406, fifth car 407, and sixth car 408 are depicted in FIG. 4 as traveling counter-clockwise around racetrack 413. In some embodiments, marker tracking controller 315 may visually track one or more salient features or a marker associated with first car 401, second car 402, third car 403, fourth car 406, fifth car 407, and sixth car 408 by means of video capture, marker tracking (marker not shown), or other tracking mechanism disclosed elsewhere herein or known in the art.

In illustrative scenario A of FIG. 4, drone 400 is configured to fly above racetrack 413 along drone flight path one 404 or drone flight path two 405. In some embodiments, separation distance controller 311 may work with one or more other elements of the present invention including but not limited to image sensor 304, marker tracking controller 315, motor 317 and rotor(s) 318, to fly drone 400 in such a way as to maintain a particular distance or position relative to one or more of first car 401, second car 402, third car 403, fourth car 406, fifth car 407, and sixth car 408.

Drone 400, in some embodiments, as indicated by the arrows next to drone 400, may switch, switch back, or switch back and forth between drone flight path one 404 and drone flight path two 405. Although the arrows next to drone 400 indicate this movement as side to side, as drone 400 follows the cars around racetrack 413, drone 400 may move in other directions than left and right, relative to the viewer.

Remaining with FIG. 4 scenario A, drone 400 may switch between drone flight path one 404 and drone flight path two 405 for any number of possible scenarios. In one illustrative scenario, flight control subsystem 108 may receive, create, provide, modify, or execute (collectively, "implement") one or more flight plan data sets that, when executed, cause drone 400 to switch between drone flight path one 404 and drone flight path two 405, or vice versa, when a car reaches a certain point on racetrack 413. Or, drone 400 may switch between drone flight path one 404 and drone flight path two 405 when drone 400 reaches a certain point on racetrack 413. In another example, drone 400 may switch between drone flight path one 404 and drone flight path two 405 when a lead change occurs between one of the cars on racetrack 413. In other words, the system may be operative to make priority modifications in real time. Drone 400 may switch between drone flight path one 404 and drone flight path two 405 multiple times in one loop. Drone may switch between drone flight path one 404 and drone flight path two 405 based on timing or sequence programming within one or more flight plan data sets, priorities between flight plan data sets, a user's use of ground control device 103, weather conditions, or any other factor. For instance, upon identifying a possible obstacle, it is contemplated that the drone can predictively set its path to avoid the obstacle. In still another example, a drone's position, such as drone 400, may be entirely controlled at any given time by the path taken by a single vehicle. In such cases any movement of such vehicle, whether along a predictable or set path or not, will define the drone's position.

Scenario B of FIG. 4 illustrates an additional capability of the present invention. In scenario B, drone 400 is shown on drone flight path one 404, approaching platform obstacle 411 and flag obstacle 412. In the embodiment depicted, one or more of flight control subsystem 108, distance detecting sensor 302, image sensor 304, marker tracking controller 315, separation distance controller 311, and obstacle avoidance controller 316, motor 317 and rotor(s) 318 may work together to detect platform obstacle 411 and flag obstacle 412 and cause drone 400 to take one or more actions, such as modifying a flight path or switching from drone flight path one 404 to drone flight path two 405 so as to avoid drone 400 from colliding with either or both of platform obstacle 411 and flag obstacle 412.

Remaining with FIG. 4 scenario B, in some embodiments, one or more of flight control subsystem 108, distance detecting sensor 302, image sensor 304, marker tracking controller 315, separation distance controller 311, and obstacle avoidance controller 316, motor 317 and rotor(s) 318 may work together to detect flag geofence 414 and platform geofence 415 and cause drone 400 to take one or more actions, such as modifying a flight path or switching from drone flight path one 404 to drone flight path two 405 so as to avoid drone 400 from crossing flag geofence 414 and/or platform geofence 415.

With continued respect to FIG. 4 scenario B, in some embodiments one or more of flight control subsystem 108, distance detecting sensor 302, image sensor 304, marker tracking controller 315, separation distance controller 311, and obstacle avoidance controller 316, motor 317 and rotor(s) 318 may work together to detect platform obstacle 411, flag obstacle 412, flag geofence 414 and platform geofence 415 and cause drone 400 to take one or more actions, such as modifying a flight path or switching from drone flight path one 404 to drone flight path two 405 so as to avoid colliding with either or both of platform obstacle 411 and flag obstacle 412 or crossing either or both of flag geofence 414 and platform geofence 415.

In some embodiments, these elements and/or others of the present invention may cause drone 400 to maintain a distance from a car, such as fifth car 407, while switching from drone flight path one 404 to drone flight path two 405. In some embodiments, when switching from drone flight path one 404 to drone flight path two 405, these elements may cause drone 400 to maintain a new distance or position from a different car, such as for example switching from following fifth car 407 along drone flight path one 404 to following fourth car 406 along drone flight path two 405.

Similarly, with respect to scenario C, the present invention may provide that the movements or flight patterns of drone 400 not collide with second drone 409 or cross second drone geofence 410. As second drone 409 and therefore cross second drone geofence 410 may be in motion through three-dimensional space, flight control subsystem 108, distance detecting sensor 302, communications unit 303, image sensor 304, camera(s) 305, motor 317 and rotor(s) 318, operating system 214, memory 212, GPS 218, inertial measurement unit 312, processor 313, at least one sensor 234, geofence avoidance controller 310, marker tracking controller 315, separation distance controller 311, and obstacle avoidance controller 316 or other element of the present invention may be equipped to process additional real-time data so as to enable drone 400 to maintain either drone flight path one 404 or drone flight path two 405, or to switch between them, and/or to maintain a destination relative to a car or marker, without coming in to contact with second drone 409 or otherwise crossing second drone geofence 410. It should be noted that, for any embodiment of the present invention, any distance or position relative to any marker can be maintained or modified by the present invention.

Figure 5:
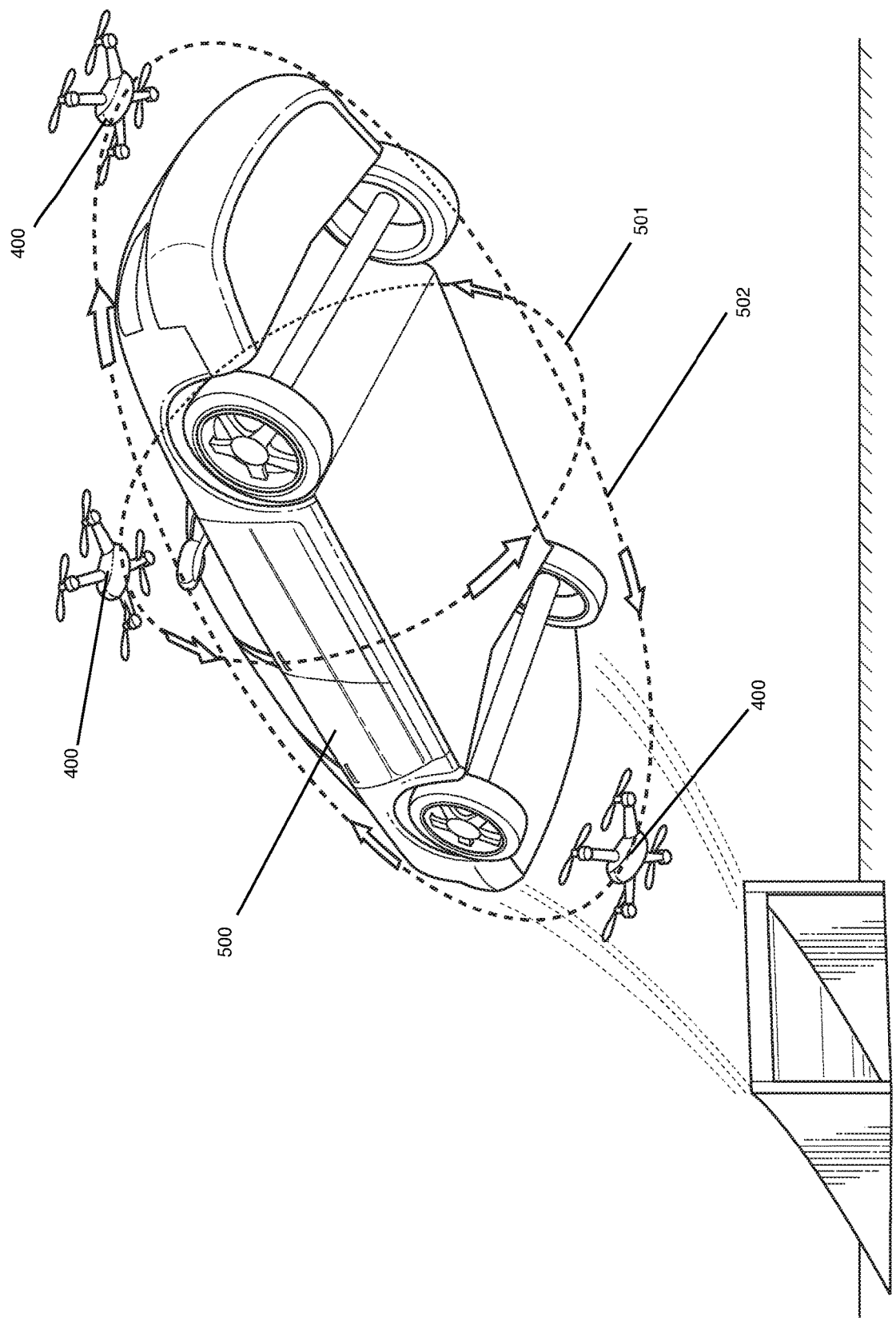
FIG. 5 is an illustration of a system for drone positioning control as used in conjunction with a launched car.

In the embodiment depicted in FIG. 5, drone 400 is depicted as flying so as to maintain a distance from a subject, represented here as car 500, while car 500 is also flying through the air. 360° drone flight path one 501 and 360° drone flight path two 502 are herein intended to represent any route in any direction wherein drone 400 maintains a fixed distance from car 500.

As generally disclosed elsewhere herein, at least one of flight control subsystem 108, image sensor 304, and/or marker tracking controller 315 (not shown in FIG. 5), may track car 500 via at least one physical marker, a digital beacon (neither shown in FIG. 5), or by another image or video capture method. Flight control subsystem 108 may be configured such that distance detecting sensor 302, image sensor 304, inertial measurement unit 312, processor 313, at least one sensor 234, and one or more subcontrollers 232 may send one or more rotor instructions to motor 317 and rotor(s) 318 so as to cause rotor(s) 318 to maintain drone 400 a certain position relative to car 500 or a marker on car 500, adjusting the distance only to avoid objects or obstacles.

In some embodiments, again by way of illustration, if car 500 and/or a marker(s) were launched in a spiral motion, flight control subsystem 108, including but not limited to elements distance detecting sensor 302, image sensor 304, inertial measurement unit 312, processor 313, at least one sensor 234, geofence avoidance controller 310, marker tracking controller 315, separation distance controller 311, and obstacle avoidance controller 316 and other elements of the present invention may generate at least one rotor instruction that may cause rotor(s) 318 to fly drone 400 in a larger spiral around car 500 and its marker(s) while maintaining the prescribed position of drone 400 relative to car 500 and its marker(s) without colliding with an object or obstacle and without crossing a geographical or marker geofence.

Figure 6:
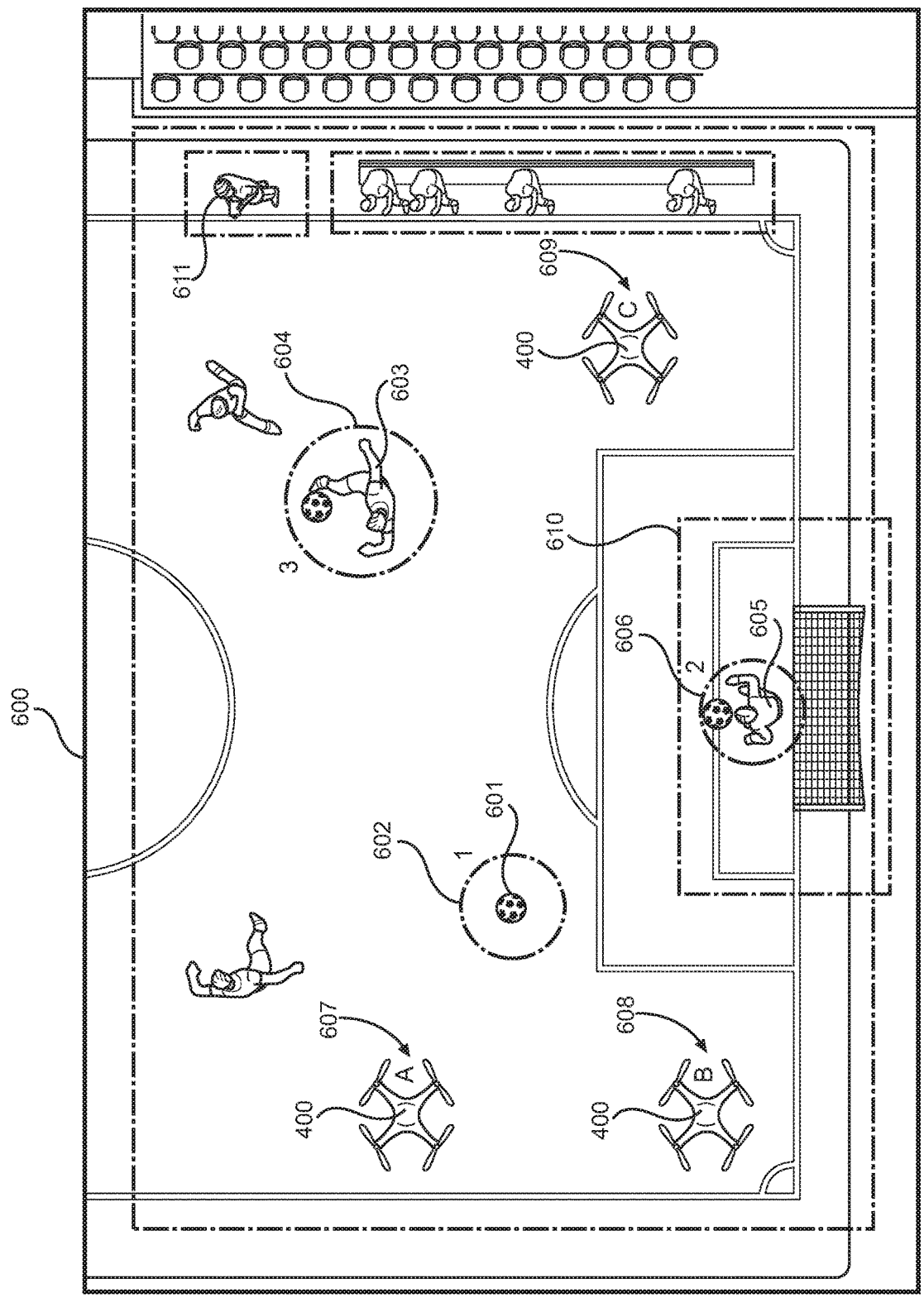
FIG. 6 is an illustration of a system for drone positioning control as used in conjunction with a soccer match.

Turning attention to FIG. 6, in some embodiments, the present invention may provide for one or more sequences of drone positioning. In FIG. 6, a viewer may perceive drone 400, geographical area 600, soccer ball marker 601, soccer ball marker geofence 602, soccer player 603, soccer player geofence 604, goalie 605, goalie geofence 606, drone position A 607, drone position B 608, drone position C 609, penalty box geofence 610, and coach 611. Drone 400 may move to one or more positions in response to one or more stimuli.

In the embodiment shown in FIG. 6, drone 400 flies to position drone position A 607, drone position B 608, and drone position C 609 in various sequences based on the position of a marker, here illustrated as a soccer ball example marker 601. Although the present invention as described in FIG. 6 is depicted as applied to a soccer field and soccer game, it is contemplated that the present invention may be practiced with respect to any subject or objects within any geographic area 600.

FIG. 6 also illustrates another capability of the present invention, wherein a geofence is used not only as a barrier for drone flight, but also as a way of initiating drone flight commands.

For example, in a "timing" sequence, drone 400 may begin at drone position A 607. For purposes of illustration, at the start of the sequence, soccer player 603 has possession of the soccer ball and therefore of soccer ball example marker 601, who then kicks soccer ball example marker 601 to goalie 605. In this example, drone 400 may fly to drone position B 608 immediately when soccer ball marker geofence 602 crosses goalie geofence 606. Or, drone 400 may fly to drone position C 609 immediately when soccer ball marker geofence 602 crosses goalie geofence 606. In some embodiments, drone 400 may fly to drone position B 608 or to drone position C 609 after a set amount of time following the moment when soccer ball marker geofence 602 crosses goalie geofence 606. In other embodiments wherein drone 400 carries a camera 305, drone 400 may fly to drone position B 608 or to drone position C 609 after a predetermined time scaling. And, any marker, any geofence, within any area, is contemplated, not only with respect to a soccer game.

Remaining with FIG. 6, by way of illustration and not limitation, in a "duration of time" sequence, soccer ball marker 601 and soccer ball marker geofence 602 may reach goalie 605 and goalie geofence 606, and drone 400 may move from drone position A 607 to drone position B 608. Then, after a certain amount of time, while soccer ball marker 601 and soccer ball marker geofence 602 are still with goalie 605 and goalie geofence 606, drone 400 may move from drone position B 608 to drone position C 609.

Or, to illustrate a "times visited" sequence, by way of non-limiting example, for each time until an "n" number of times (for example, three times) that soccer ball marker 601 and soccer ball marker geofence 602 has reached goalie 605 and goalie geofence 606, drone 400 may remain at drone position A 607. Then, on the "n" time, in this example the third time, that soccer ball marker 601 and soccer ball marker geofence 602 reaches goalie 605 and goalie geofence 606, drone 400 may move to drone position B 608. Then after "n" has been satisfied, in this example, on the fourth time, when soccer ball marker 601 and soccer ball marker geofence 602 reaches goalie 605 and goalie geofence 606, drone 400 may move to drone position C 609.

Remaining with FIG. 6, such sequences can apply to more than one drone 400 and/or one subject, here soccer ball marker 601. For instance, in embodiments with multiple subjects and one drone 400, again by way of non-limiting example, drone 400 may remain at drone position A 607 until both soccer ball marker 601 and soccer ball marker geofence 602 and soccer player 603, soccer player geofence 604 cross penalty box geofence 610, whereupon drone 400 may move to drone position B 608 or to drone position C 609. When three, four, or more subjects are tracked, similar patterns may be provided.

Relatedly, in an embodiment having multiple drones 400, one drone 400 may move from drone position A 607 to drone position B 608 when soccer ball marker 601 and soccer ball marker geofence 602 cross penalty box geofence 610, and a second drone 400 (not pictured) may reach drone position C 609 when soccer player 603 and soccer player geofence 604 cross penalty box geofence 610.

In addition to a marker being used to track a subject, in some embodiments, a marker may be used to track part of a subject. For example, a marker placed on a hand of goalie 605 may enable a sequence wherein the present invention may recognize when goalie 605 makes a specific gesture. In such an embodiment, when soccer ball marker 601 and soccer ball marker geofence 602 reach goalie 605 and goalie geofence 606, drone 400 may move to drone position B 608. Then after the hand of goalie 605 makes a gesture, such as for example waving other players forward, drone 400 may move to drone position C 609.

In some embodiments, the aforementioned stimuli may not correlate to a change in position of one or more markers or passage of time, but may instead correlate to the action of a third party, entity, or object. By way of illustration and not limitation, a change in lighting of a subject may be detected by at least one sensor 234 and cause flight control subsystem 108 and/or one more subcontrollers 232 to execute a command resulting in drone 400 changing positions, such as by way of illustration, from drone position A 607 to drone position B 608. Or, a vibration or sound may be detected by at least one sensor 234 and may cause drone 400 to change position. Any action or inaction of or by any element not a part of the present invention may serve as a stimulus for any sequence or action of the present invention.

The present invention may also be configured for use with subjects or markers of different priorities. In some embodiments, image sensor 304 may be configured to recognize at least one first priority marker, at least one first priority distance comprising the distance between the drone and the at least one first priority marker, and at least one first priority destination. Moreover, image sensor 304 may also recognize at least one second priority marker, at least one second priority distance comprising the distance between the drone and the at least one second priority marker, and at least one second priority destination. In response to these or other stimuli, flight control subsystem 108 may execute at least one command comprising at least one if-then relationship, wherein the if-then relationship comprises at least one condition that when fulfilled causes flight control subsystem 108 to cause the at least one rotor 318 to reposition drone 400 from the first priority destination to the second priority destination.

By way of illustration and not limitation, in FIG. 6, coach 611 may be first priority, soccer ball marker 601 may be second priority, and soccer player 603 may be third priority. As the game is played, drone 400 may follow soccer ball marker 601 as it moves about the pitch, or may occupy drone position A 607. However, should coach 611 enter the field, the higher priority assigned to coach 611 may trump soccer ball marker 601, and drone 400 may move to drone position C 609. Or, if coach 611 is on the bench and soccer ball marker 601 is out of bounds, drone 400 may move to a position associated with soccer player 603, such as but not limited to drone position A 607, drone position B 608, or drone position C 609.

Examples of other conditions may include, but are not limited to, a full or partial loss of line of sight, or a break in the line of sight, between drone 400 and either or both of the first priority marker and the second priority marker. In such cases, it is contemplated that the drone may be operative to predictively avoid such conditions. In other words, if full or partial loss of line or sight becomes likely, the drone may be configured to detect this possibility in advance and avoid such full or partial loss of line of sight, or other undesirable condition. Another example may include differences in spatial orientation of the first priority marker and the second priority marker such that their priorities, based on one or more hierarchies that may be predetermined or ascertained in real-time by flight control subsystem 108, a subcontroller 232, the at least one image sensor 304, at least one sensor 234, the at least one processor 313, or the at least one ground control device 103. Another example is a change in position such that the at least one second priority marker is closer to an object of interest than the at least one first priority marker, or if either the at least one first priority marker or the at least one second priority marker leaves the geographical area or crosses a geographical geofence or a marker geofence. Any other condition or event could potentially result in the present invention either preferring one marker over another or being unable to maintain its position relative to either the at least one first priority marker or the at least one second priority marker.

Any combination of any number of drones 400 reaching any position, including any number of positions or locations of positions, in any sequence or any manner, following any number or priorities of subjects, markers, or objects in addition to those disclosed in FIG. 6 is also contemplated.

Figure 7:
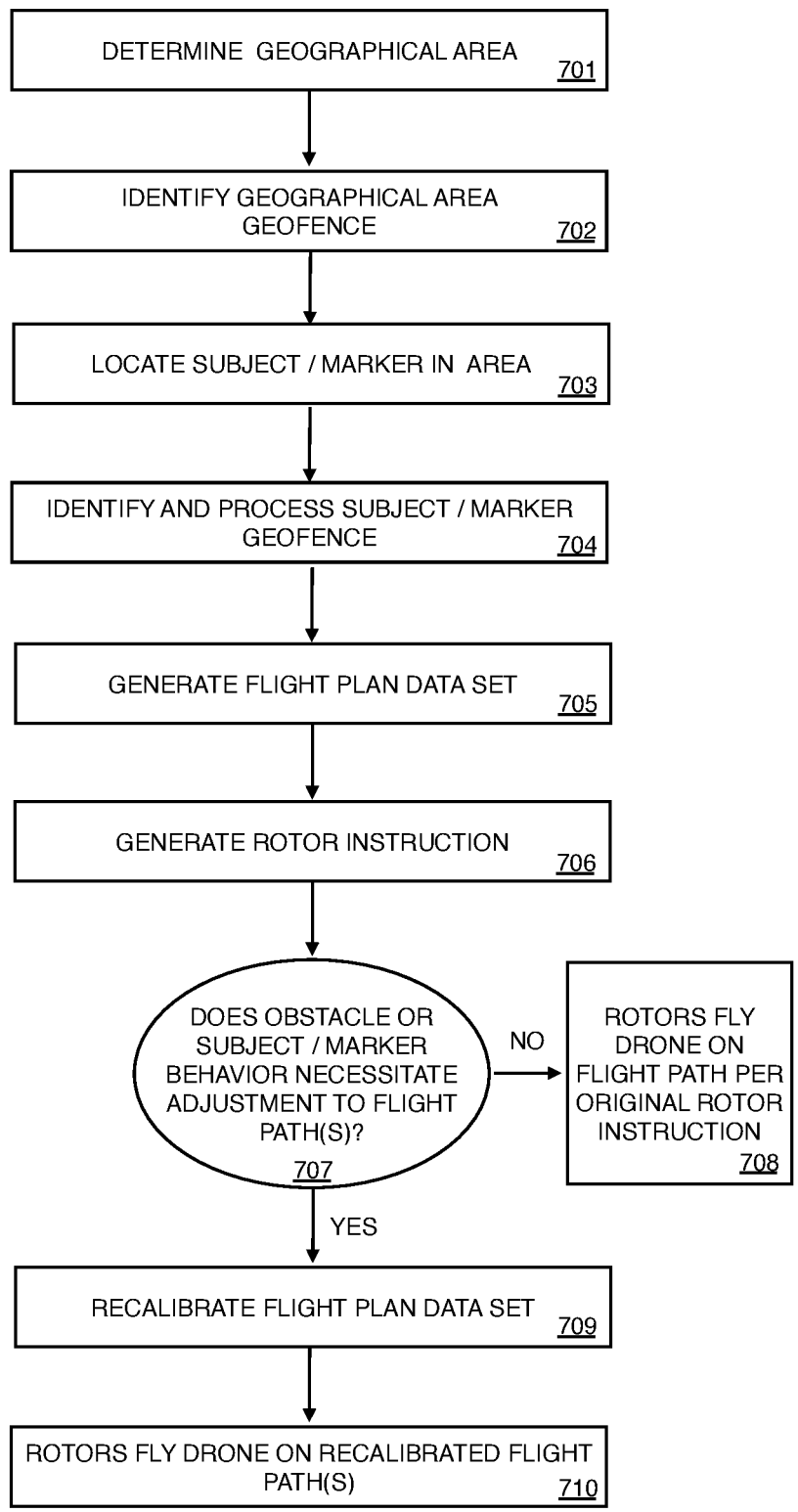
FIG. 7 is a flowchart illustrating an exemplary embodiment of a method for drone positioning control.

Turning attention to FIG. 7, a method for drone flight control may comprise, by a flight control subsystem communicatively coupled to at least one ground control device, at least one drone having at least one rotor, and at least one processor: A) determining at least one geographical area 701 having a geographical area perimeter, wherein the at least one geographical area comprises at least three latitude and longitude coordinates, as well as determining at least one obstacle within the at least one geographical area, B) identifying at least one geographical geofence 702 within the at least one geographical area, wherein the at least one geographical geofence comprises a digital boundary in digital three-dimensional space, and wherein the geographical geofence is located a distance from the at least one geographical area perimeter, C) locating at least one subject or marker 703 having at least one subject/marker location, wherein the at least one subject/marker location represents the position of the at least one subject or marker in three-dimensional space, D) identifying and processing at least one subject/marker geofence 704, wherein the at least one subject/marker geofence exists in digital three dimensional space a distance from the at least one subject/marker location, E) generating at least one flight plan data set 705, wherein the at least one flight plan data set may comprise a) at least one flight path, wherein the at least one flight path is at least one drone flight course plotted within the at least one geographical area, wherein the at least one flight path is configured to cause the drone to (i) avoid contacting the at least one obstacle, ii) avoid crossing the at least one geographical geofence; and iii) avoid crossing the at least one marker geofence, and b) recognizing at least one destination along the at least one flight path, wherein the at least one destination is a prescribed location in three-dimensional space based at least in part on a distance from the at least one marker location, comprises at least one flight path, F) generating at least one rotor instruction 706 configured to cause the flight control subsystem to operate the at least one rotor such that the drone reaches the at least one destination, G) assessing whether one or more obstacles, the behavior of one or more subjects and/or markers, or both necessitates a change or adjustment to at least one flight path(s) 707, H) if no change or adjustment is required, causing the rotor(s) to fly the drone on the original flight path(s) per the rotor instruction 708, I) if a change or adjustment to one or more flight path(s) is required, recalibrating the flight plan data set and at least one flight path 709, and J) causing the rotors to fly the drone on the recalibrated flight path(s) per the recalibrated flight plan data set 710.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as ground control device 103, mobile devices 102, 104, and 106, and/or any comparable device. The machine code may be converted from the source code, etc. If embodied in hardware, each block may represent a circuit or a number of interconnected circuits to implement the specified logical function(s).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the present invention with which that terminology is associated. In general, the terms used in the following claims should not be constructed to limit the present invention to the specific embodiments disclosed in the specification unless the above description section explicitly define such terms. Accordingly, the actual scope encompasses not only the disclosed embodiments, but also all equivalent ways of practicing or implementing the disclosed present invention. The above description of embodiments of the present invention is not intended to be exhaustive or limited to the precise form disclosed above or to a particular field of usage.

While specific embodiments of, and examples for, the present invention are described above for illustrative purposes, various equivalent modifications are possible for which those skilled in the relevant art will recognize.

While certain aspects of the present invention are presented below in particular claim forms, various aspects of the present invention are contemplated in any number of claim forms. Thus, the inventor reserves the right to add additional claims after filing the application to pursue such additional claim forms for other aspects of the present invention.

What is claimed is:

1. A system for drone positioning control, comprising at least:
   a drone;
   a positioning control subsystem onboard the drone, wherein the positioning control subsystem is configured to provide positioning control for the drone by executing at least one positioning plan data set;
   at least one subcontroller communicatively coupled to the positioning control subsystem;
   at least one ground control device communicatively coupled to the positioning control subsystem;
   at least one processor configured to:
   a) determine at least one geographical area having a geographical area perimeter;
   b) identify any obstacle present within the at least one geographical area;
   c) determine at least one geographical geofence within the at least one geographical area, wherein the at least one geographical geofence comprises a digital boundary in digital three-dimensional space, and wherein the at least one geographical geofence is located at least one first geographical distance from the at least one geographical area perimeter;
   d) recognize the at least one geographical geofence as a drone position boundary;
   e) recognize at least one marker having at least one marker location, wherein the at least one marker location represents the position of the at least one marker in three-dimensional space;
   f) determine at least one marker geofence, wherein the at least one marker geofence exists in digital three-dimensional space, and wherein the at least one marker geofence is located at least one first marker distance from the at least one marker location;
   g) recognize the at least one marker geofence as a drone flight boundary;
   h) generate a positioning plan data set, comprising:
     a. at least one path, wherein the at least one path is a drone positioning course plotted within the at least one geographical geofence, wherein the at least one path is configured to cause the drone to:
       i. avoid contacting any identified obstacle;
       ii. avoid crossing the at least one geographical geofence; and
       iii. avoid crossing the at least one marker geofence;
     b. at least one destination along the at least one path, wherein the at least one destination is a prescribed location in three-dimensional space based at least in part on at least one destination distance from the at least one marker location; and
     c. at least one rotor instruction, wherein the at least one rotor instruction is configured to cause the positioning control subsystem to operate the at least one rotor such that the drone reaches the at least one destination; and
   i) transmit the at least one positioning plan data set to the positioning control subsystem.

2. The system of claim 1, wherein the at least one marker is at least one beacon marker, wherein the at least one beacon marker is physically attached to at least one subject, wherein the at least one marker perimeter is at least one beacon marker perimeter, wherein the at least one first marker location is at least one first beacon marker location, and wherein the at least one marker geofence is at least one beacon marker geofence.

3. The system of claim 1, wherein the at least one marker is at least one digital marker, wherein the at least one digital marker is digitally attached to at least one subject, wherein the at least one first marker location is at least one first digital marker location, wherein the at least one marker geofence is at least one digital marker geofence, and wherein the at least one marker geofence is at least one digital marker geofence.

4. The system of claim 3, further comprising at least one image sensor, wherein the at least one image sensor is configured to:

a) detect at least one image;
b) detect at least one subject within the at least one image;
c) detect at least one salient feature of the at least one subject from within the at least one image;
d) digitally apply at least one digital marker to the at least one subject, wherein the at least one digital marker overlays the at least one salient feature; and
e) transmit the at least one image, the at least one salient feature, and the at least one digital marker to the positioning control subsystem.

5. The system of claim 3, wherein the positioning control subsystem is configured to receive and process at least one image, at least one salient feature, and at least one digital marker, and wherein the at least one ground control device is configured to:
a) detect at least one image;
b) detect at least one subject within the at least one image;
c) detect at least one salient feature of the at least one subject from within the at least one image;
d) digitally apply at least one digital marker to the at least one subject, wherein the at least one digital marker overlays the at least one salient feature; and
e) transmit the at least one image, the at least one salient feature, and the at least one digital marker to the positioning control subsystem.

6. The system of claim 1, wherein the at least one marker, the at least one marker geofence, and the at least one destination are in motion within the at least one geographical geofence.

7. The system of claim 6, wherein the at least one rotor instruction is configured to cause the positioning control subsystem to operate the at least one rotor so as to cause the drone to maintain its position at the at least one destination.

8. The system of claim 7, wherein the at least one marker and the at least one marker geofence are traveling in a spiral motion.

9. The system of claim 1, further comprising at least one camera onboard the drone, wherein the at least one camera is communicatively coupled to the at least one processor.

10. The system of claim 1, wherein the at least one processor is communicatively coupled to the at least one subcontroller.

11. The system of claim 1, wherein the at least one processor is further configured to:
a) determine a first destination paired with a first marker location;
b) determine at least one timing interval having an expiration point;
c) determine at least one additional destination paired with at least one additional marker location; and
d) execute at least one rotor instruction configured to cause the positioning control subsystem to operate the at least one rotor so as to fly the drone to the at least one additional destination after the at least one timing interval expires.

12. The system of claim 1, wherein the at least one processor is further configured to:
a) determine a first destination paired with a first marker location;
b) determine at least one sequence command;
c) determine at least one additional destination paired with at least one additional marker location; and
d) execute at least one rotor instruction configured to cause the positioning control subsystem to operate the at least one rotor so as to fly the drone to the at least one additional destination according to the sequence command.

13. The system of claim 1, wherein the at least one processor is further configured to:
a) recognize at least one first priority marker, at least one first priority distance comprising the distance between the drone and the at least one first priority marker, and at least one first priority destination;
b) recognize at least one second priority marker, at least one second priority distance comprising the distance between the drone and the at least one second priority marker, and at least one second priority destination; and
c) execute at least one command comprising at least one if-then relationship, wherein the if-then relationship comprises at least one condition that when fulfilled initiates an instruction to the positioning control subsystem to cause the at least one rotor to reposition the drone from the first priority destination to the second priority destination.

14. The system of claim 13, wherein the condition comprises a break in a line of sight between at least one image sensor and the at least one first priority marker.

15. The system of claim 13, wherein the condition comprises a change in position between the at least one first priority marker and the at least one second priority marker such that the at least one second priority marker is closer to an object of interest than the at least one first priority marker.

16. A method for drone positioning control, comprising:
by a positioning control subsystem communicatively coupled to at least one ground control device, at least one drone, at least one image sensor onboard the drone, at least one subcontroller communicatively coupled to the positioning control subsystem, and at least one processor:
determining at least one geographical area having a geographical area perimeter, wherein the at least one geographical area comprises at least three latitude and longitude coordinates;
identifying any obstacle within the at least one geographical area;
determining at least one geographical geofence within the at least one geographical area, wherein the at least one geographical geofence comprises a digital boundary in digital three-dimensional space, and wherein the geographical geofence is located a distance from the at least one geographical area perimeter;
recognizing the at least one geographical geofence as at least one geographical geofence drone boundary;
recognizing at least one marker having at least one marker location, wherein the at least one marker location represents the position of the at least one marker in three-dimensional space;
determining at least one marker geofence, wherein the at least one marker geofence exists in digital three dimensional space a distance from the at least one marker location;
recognizing the at least one marker geofence as at least one marker geofence drone boundary;
generating a positioning plan data set, comprising:
a) at least one path, wherein the at least one path is a drone positioning course plotted within the at least one geographical geofence, wherein the at least one path is configured to cause the drone to:
i. avoid contacting any identified obstacle;
ii. avoid crossing the at least one geographical geofence; and
iii. avoid crossing the at least one marker geofence;
b) at least one destination along the at least one path, wherein the at least one destination is a prescribed location in three-dimensional space based at least in part on a distance from the at least one marker location; and c) at least one rotor instruction, wherein the at least one rotor instruction is configured to cause the positioning control subsystem to operate the at least one rotor such that the drone reaches the at least one destination; and transmitting the at least one positioning plan data set to the positioning control subsystem.

17. An apparatus for drone positioning control, comprising:

a drone;

a positioning control subsystem onboard the drone, wherein the positioning control subsystem is configured to provide positioning control for the drone by executing at least one flight plan data set;

at least one subcontroller communicatively coupled to the positioning control subsystem;

at least one ground control device communicatively coupled to the positioning control subsystem;

at least one image sensor onboard the drone and communicatively coupled to the positioning control subsystem; and at least one processor configured to:
 a) determine at least one geographical area having a geographical area perimeter, wherein the at least one geographical area comprises at least three latitude and longitude coordinates;
 b) identify any obstacle within the at least one geographical area;
 c) determine at least one geographical geofence within the at least one geographical area, wherein the at least one geographical geofence comprises a digital boundary in digital three-dimensional space, and wherein the at least one geographical geofence is located at least one first geographical distance from the at least one geographical area perimeter;
 d) recognize the at least one geographical geofence as a drone boundary;
 e) recognize at least one marker having at least one marker location, wherein the at least one marker location represents the position of the at least one marker in three-dimensional space;
 f) determine at least one marker geofence, wherein the at least one marker geofence exists in digital three-dimensional space, and wherein the at least one marker geofence is located at least one first marker distance from the at least one marker location;
 g) recognize the at least one marker geofence as a drone boundary;
 h) generate a positioning plan data set, comprising:
  a. at least one path, wherein the at least one path is a drone positioning course plotted within the at least one geographical geofence, wherein the at least one path is configured to cause the drone to:
   i. avoid contacting any identified obstacle;
   ii. avoid crossing the at least one geographical geofence; and
   iii. avoid crossing the at least one marker geofence;
  b. at least one destination along the at least one path, wherein the at least one destination is a prescribed location in three-dimensional space based at least in part on at least one destination distance from the at least one marker location; and
  c. at least one rotor instruction, wherein the at least one rotor instruction is configured to cause the positioning control subsystem to operate the at least one rotor such that the drone reaches the at least one destination; and
 i) transmit the at least one positioning plan data set to the positioning control subsystem.

18. The apparatus of claim 17, wherein the at least one marker, the at least one marker geofence, and the at least one destination are in motion within the at least one geographical geofence, and wherein the at least one rotor instruction is configured to cause the positioning control subsystem to operate the at least one rotor so as to cause the drone to maintain its position at the at least one destination.

19. The apparatus of claim 17, wherein the at least one processor is further configured to:
 a) recognize at least one first priority marker, at least one first priority distance comprising the distance between the drone and the at least one first priority marker, and at least one first priority destination;
 b) recognize at least one second priority marker, at least one second priority distance comprising the distance between the drone and the at least one second priority marker, and at least one second priority destination; and
 c) execute at least one command comprising at least one if-then relationship, wherein the if-then relationship comprises at least one condition that when fulfilled initiates an instruction to the positioning control subsystem to cause the at least one rotor to reposition the drone from the first priority destination to the second priority destination.

20. The apparatus of claim 17, wherein the at least one rotor instruction is configured to cause the drone to reach a plurality of destinations in a sequence, wherein the sequence comprises:
 a) a first destination paired with a first marker location; and
 b) at least one additional destination.

* * * * *